(12) United States Patent
Yokouchi (10) Patent No.: US 8,507,133 B2
(45) Date of Patent: Aug. 13, 2013

(54) ANODE ACTIVE MATERIAL, ANODE, AND LITHIUM SECONDARY BATTERY

(75) Inventor: Keiichi Yokouchi, Shizuoka-ken (JP)

(73) Assignee: Toyota Jidosha Kabushiki Kaisha, Toyota-shi, Aici-ken (JP)

( * ) Notice: Subject to any disclaimer, the term of this patent is extended or adjusted under 35 U.S.C. 154(b) by 481 days.

(21) Appl. No.: 12/377,132

(22) PCT Filed: Sep. 6, 2007

(86) PCT No.: PCT/JP2007/067430
§ 371 (c)(1),
(2), (4) Date: Feb. 11, 2009

(87) PCT Pub. No.: WO2008/029888
PCT Pub. Date: Mar. 13, 2008

(65) Prior Publication Data
US 2009/0274960 A1 Nov. 5, 2009

(30) Foreign Application Priority Data

Sep. 7, 2006 (JP) ................................. 2006-243252

(51) Int. Cl.
*H01M 4/58* (2010.01)
*B05D 5/12* (2006.01)
*C23C 30/00* (2006.01)

(52) U.S. Cl.
USPC ....... 429/218.1; 29/623.5; 427/123; 427/113; 427/122

(58) Field of Classification Search
USPC .................... 429/218.1; 29/623.5; 427/123, 427/122, 113
See application file for complete search history.

(56) References Cited

U.S. PATENT DOCUMENTS

| | | | |
|---|---|---|---|
| 6,828,063 B2 * | 12/2004 | Park et al. ................. | 429/219 |
| 2002/0074972 A1 * | 6/2002 | Narang et al. ............. | 320/131 |
| 2003/0138698 A1 * | 7/2003 | Lee et al. ................... | 429/231.8 |
| 2004/0127621 A1 * | 7/2004 | Drzal et al. ................ | 524/424 |
| 2011/0027402 A1 * | 2/2011 | Josephy et al. ............. | 425/95 |

FOREIGN PATENT DOCUMENTS

| | | |
|---|---|---|
| JP | 04-074851 | 3/1992 |
| JP | 2000-12088 | 1/2000 |
| JP | 2001-256968 | 9/2001 |
| JP | 2002-042806 | 2/2002 |
| JP | 2002-198037 | 7/2002 |
| JP | 2003-142088 | 5/2003 |
| JP | 2004-071464 | 3/2004 |
| JP | 2004071464 A * | 3/2004 |
| JP | 2004-139768 | 5/2004 |
| JP | 2004-288564 | 10/2004 |
| JP | 2004-319469 | 11/2004 |
| JP | 2005-166414 | 6/2005 |

(Continued)

OTHER PUBLICATIONS

Machine translation of Imori, JP 2004-071464 A.*

(Continued)

*Primary Examiner* — Edu E Enin-Okut
(74) *Attorney, Agent, or Firm* — Finnegan, Henderson, Farabow, Garrett & Dunner, LLP (57) ABSTRACT

The principal object of the present invention is to provide an anode active material suitable for rapid charging. The present invention provides an anode active material comprising a metallic part which comprises Sn or Si and has a film thickness of 0.05 μm or less, and thereby solving the problem.

9 Claims, 5 Drawing Sheets

(56) References Cited

FOREIGN PATENT DOCUMENTS

| | | | |
|---|---|---|---|
| JP | 2005-294078 | | 10/2005 |
| JP | 2005-294079 | | 10/2005 |
| JP | 2005298907 A | * | 10/2005 |
| JP | 2005-332769 | | 12/2005 |
| JP | 2006222073 A | * | 8/2006 |
| JP | 2007-103130 | | 4/2007 |
| JP | 2007-141573 | | 6/2007 |
| JP | 2007-194204 | | 8/2007 |
| JP | 2007-311180 | | 11/2007 |
| WO | WO 03/100888 A1 | | 12/2003 |

OTHER PUBLICATIONS

Machine translation for Yoshida et al., JP 2005-298907 A.*

Sumiya, K., et al., "Enhancement of the electrochemical Li doping/undoping reaction rate of a graphitic material by an evaporated film of Sn, Zn or Pb," Journal of Electroanalytical Chemistry, vol. 462, (1999), pp. 150-156.

* cited by examiner

ANODE ACTIVE MATERIAL, ANODE, AND LITHIUM SECONDARY BATTERY

CROSS-REFERENCE TO RELATED APPLICATIONS

This application is a national phase application of International Application No. PCT/JP2007/067430, filed Sep. 6, 2007, and claims the priority of Japanese Application No. 2006-243252, filed Sep. 7, 2006, the contents of both of which are incorporated herein by reference.

TECHNICAL FIELD

The present invention relates to an anode active material suitable for rapid charging, as well as an anode and a lithium secondary battery using the same.

BACKGROUND ART

With miniaturization of personal computers, video cameras and portable phones, lithium secondary batteries are put to practical use and become widespread as power sources because of high energy density in the devices in the fields of information-related devices and communication devices. In the field of automobiles, there is also urgent demand for development of electric vehicles, because of environment problems and resources problems, and lithium secondary batteries are also examined as power sources for the electric vehicles.

Conventionally, as anode active materials used in lithium secondary batteries, carbon materials such as graphite have been widely used, but the Li storage capacity of the carbon materials is generally low, and thus Sn, Sn alloys etc. that have a higher Li storage capacity than in the carbon materials attract attention.

Patent Document 1 discloses a porous film electrode comprising: a current collector consisting of a material not alloying with Li, and a film consisting of Sn or an Sn-containing alloy and being formed by electroplating on the current collector, wherein the film is a porous film having a specific density. In the Examples therein, it is described that a film of Sn alloy or the like having a film thickness of about 10 μm was formed.

Patent Document 2 discloses an anode material for non-aqueous-electrolyte secondary battery, which uses as an anode material a copper foil electroplated with Sn—Ni and the like. In the Examples therein, it is described that a film of Sn alloy or the like having a film thickness of about 14 to 30 μm was formed.

Patent Document 3 discloses an electrode material for secondary battery, comprising a current collector having a tin- or tin alloy-plated coat formed on one side or both sides thereof by precipitation from a tin or tin-alloy plating bath, wherein the plated coat has formed a coat consisting of substantially continuing plating particles having an average particle size of less than 0.5 μm, and the plated coat has been precipitated from a tin or tin-alloy plating bath having a specific component. In the Examples therein, it is described that a film of Sn alloy or the like having a film thickness of about 2 μm was formed.

On one hand, when a lithium secondary battery for example is applied to automobiles, the lithium secondary battery is required to enable rapid charging. However, even if the lithium secondary batteries etc. described in the Patent Documents mentioned above are used, effective rapid charging are not feasible in some cases.

Patent Document 1: JP-A-2004-139768
Patent Document 2: JP-A-2001-256968
Patent Document 3: JP-A-2003-142088

DISCLOSURE OF INVENTION

Problem to be Solved by the Invention

The present invention was made in view of the problem described above, and the principal object of the present invention is to provide an anode active material suitable for rapid charging.

Means for Solving the Problem

To solve the problem, the present invention provides an anode active material comprising a metallic part which comprises Sn or Si and has a film thickness of 0.05 μm or less.

According to the present invention, the film thickness of the metallic part is set at the above-mentioned value or less, and the anode active material can thereby made suitable for rapid charging. When a lithium secondary battery is charged, Li ions are inserted into an anode active material. By sufficiently reducing the film thickness of the anode active material, Li ions can easily spread, thereby making the anode active material suitable for rapid charging.

In the present invention, the metallic part is preferably a metallic film. This is because the anode active material is filmy, the distance of Li diffusion during charging is reduced, and rapid charging (charging at high rate) becomes possible.

In the present invention, the metallic part is preferably a metallic flake. This is because the anode active material is flaky, the anode active material can have a larger surface area than that of the filmy anode active material described above and can attain higher output.

In the present invention, the anode active material is preferably a flaky material comprising the metallic part and a carbon coat laminated therein. This is because when the carbon coat is disposed, electronic resistance can be reduced and higher output can be achieved.

In the present invention, the metallic part is preferably formed so as to cover a surface of a carbon particle. This is because when an anode active material is formed by covering a carbon particle with the metallic part, the anode active material can have higher electrical conductivity, the internal resistance can be reduced, and higher output can thereby be achieved.

According to the present invention, there is provided an anode which uses the anode active material described above. According to the present invention, the anode active material is used in an anode thereby making the anode suitable for rapid charging.

According to the present invention, there is provided a lithium secondary battery which uses the anode described above. According to the present invention, the anode is used in a lithium secondary battery thereby making the lithium secondary battery suitable for rapid charging.

According to the present invention, there is provided a method for manufacturing an anode active material, comprising steps of: forming a metallic film which comprises Sn or Si and has a film thickness of 0.05 μm or less on a substrate; and pulverizing the metallic film being peeled from the substrate.

According to the present invention, a flaky anode active material can be obtained, and an anode active material suitable for rapid charging can thereby be obtained.

According to the present invention, there is provided a method for manufacturing an anode active material, comprising steps of: forming a metal-carbon laminate on a substrate by carrying out a step of forming a metallic film which comprises Sn or Si and has a film thickness of 0.05 μm or less on a substrate, and a step of forming a carbon coat; and pulverizing the metal-carbon laminate being peeled from the substrate.

According to the present invention, an anode active material that is a filmy material comprising a metallic part and a carbon coat laminated therein can be obtained, and an anode active material suitable for raid charging can thereby be obtained.

According to the present invention, there is provided a method for manufacturing an anode active material, comprising a step of forming a metallic film which comprises Sn or Si and has a film thickness of 0.05 μm or less on a surface of a carbon particle.

According to the present invention, an anode active material comprising a metallic film formed on a surface of a carbon particle can be obtained, and an anode active material suitable for rapid charging can thereby be obtained.

According to the present invention, there can be provided a method for manufacturing an anode, comprising a step of forming a metallic film which comprises Sn or Si and has a film thickness of 0.05 μm or less on an anode current collector.

According to the present invention, an anode comprising a filmy anode active material formed on an anode current collector can be obtained, and an anode suitable for rapid charging can thereby be obtained.

Effect of the Invention

According to the present invention, there is brought about an effect by which an anode active material etc. suitable for rapid charging can be obtained.

DESCRIPTION OF REFERENCE NUMERALS

| 1 | metallic part |
|---|---|
| 1' | metallic film |
| 2 | anode current collector |
| 3 | carbon coat |
| 4 | carbon particle |
| 6 | metal-carbon laminate |
| 10 | anode active material |

BEST MODE FOR CARRYING OUT THE INVENTION

Hereinafter, the anode active material, the anode, the lithium secondary battery, the method for manufacturing an anode active material, and the method for manufacturing an anode according to the present invention are described in detail.

A. Anode Active Material

First, the anode active material of the present invention is described in detail. The anode active material of the present invention is characterized by comprising a metallic part which comprises Sn or Si and has a film thickness of 0.05 μm or less.

According to the present invention, an anode active material suitable for rapid charging can be obtained by setting the film thickness of the metallic part at the above value or less. When a lithium secondary battery is charged, Li ions are inserted into an anode active material. By sufficiently reducing the film thickness of the anode active material, Li ions can easily spread, thereby making the anode active material suitable for rapid charging. In the present invention, Sn or Si is used as a constituent material of the metallic part, whereby the anode active material can have a larger Li storage capacity than in carbon materials such as graphite, thereby enabling downsizing of batteries.

In the present invention, the film thickness of the metallic part is usually 0.05 μm or less, preferably in the range of 0.005 μm to 0.05 μm, more preferably in the range of 0.01 μm to 0.02 μm. This is because the anode active material can be made more suitable for rapid charging. The film thickness of the metallic part can be measured with a scanning electron microscope (SEM).

The metallic part comprises Sn or Si. In the present invention, the metallic part is not particularly limited as long as it contains Sn or Si as a major component, and the metallic part may include trace components other than Sn or Si. The trace components include, for example, Ni, Zn, Mn, Ti, La, Cr, Nb, and Ag. The metallic part may contain trace amounts of impurities generated during production of the metallic part. The content of Sn or Si in the metallic part is usually 50 mol % or more, preferably 80 mol % or more.

The anode active material of the present invention is not particularly limited as long as it has the metallic part described above. The anode active material may be composed exclusively of the metallic part or may be a combination of the metallic part and a carbon material or the like. Hereinafter, specific examples of the anode active material of the present invention are described by reference to first to fourth embodiments thereof.

1. First Embodiment

The anode active material in this embodiment is an anode active material comprising a metallic part which comprises Sn or Si and has a film thickness of 0.05 μm or less, wherein the metallic part is a metallic film.

According to this embodiment, the anode active material is filmy, and thus the distance of Li diffusion during charging is reduced and rapid charging (charging at high rate) becomes possible. According to this embodiment, a uniform metallic film can be easily obtained for example by sputtering, so that when a lithium secondary battery is manufactured by using the anode active material in this embodiment, the resulting lithium secondary battery is excellent in cycle characteristics.

Figure 1:
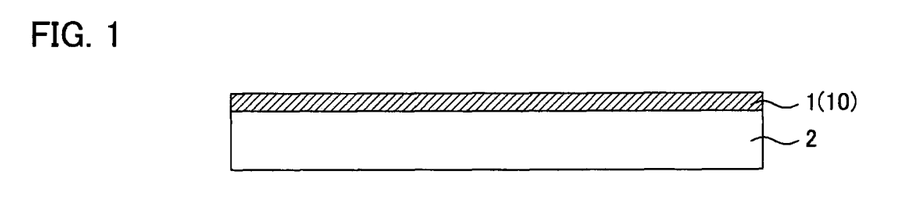
FIG. 1 is an explanatory diagram showing one example of the anode active material of the present invention.

FIG. 1 is an explanatory diagram showing one example of the anode active material in this embodiment. The anode active material 10 shown in FIG. 1 is composed exclusively of a filmy metallic part 1. As shown in FIG. 1, the metallic part 1 can be formed on an anode current collector 2 and used as an anode as it is without using a binder etc.

In this embodiment, the film thickness of the metallic part is usually 0.05 μm or less, preferably in the range of 0.005 μm to 0.05 μm, and more preferably in the range of 0.01 to 0.02 μm.

The anode active material in this embodiment can be manufactured for example by sputtering. A specific manufacturing method will be described later in "C. Method for Manufacturing Anode".

2. Second Embodiment

The anode active material in this embodiment is an anode active material comprising a metallic part which comprises Sn or Si and has a film thickness of 0.05 μm or less, wherein the metallic part is metallic flakes.

According to this embodiment, the anode active material is flaky and can thus serve as an anode active material having a larger surface area than that of the filmy anode active material described above. Accordingly, when a lithium secondary battery is manufactured by using the anode active material in this embodiment, the contact area between the anode active material and an electrolyte is increased and thereby decreasing resistance, to permit higher output.

Figure 2:
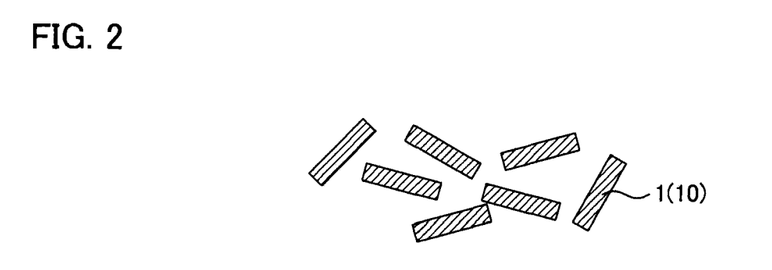
FIG. 2 is an explanatory diagram showing another example of the anode active material of the present invention.

FIG. 2 is an explanatory diagram showing one example of the anode active material in this embodiment. The anode active material 10 shown in FIG. 2 is composed exclusively of a flaky metallic part 1. If necessary, the anode active material may also contain an electrically conductive material. In this embodiment, "metallic flakes" refers to those manufactured by pulverizing a metallic film into pieces having a predetermined size.

In this embodiment, the film thickness of the metallic part is usually 0.05 μm or less, preferably in the range of 0.005 μm to 0.05 μm, and more preferably in the range of 0.01 μm to 0.02 μm.

In this embodiment, the average size of the metallic film, when observed in the plane direction, varies depending on factors such as the type of a lithium secondary battery used, but is usually preferably in the range of 0.05 μm to 50 μm, and particularly in the range of 0.05 μm to 10 μm.

The anode active material in this embodiment may contain an electrically conductive material in order to improve electrical conductivity. The electrically conductive material may be the same as used in general lithium secondary batteries and is not particularly limited. Specific examples include carbon black and the like.

The anode active material in this embodiment can be manufactured by, for example, forming a metallic film on a substrate by sputtering and pulverizing the metallic film. A specific manufacturing method will be described later in detail in "1. Fifth Embodiment" in "B. Method for Manufacturing Anode Active Material".

3. Third Embodiment

The anode active material in this embodiment is an anode active material comprising a metallic part which comprises Sn or Si and has a film thickness of 0.05 μm or less, wherein the anode active material is a flaky material having the metallic part and a carbon coat laminated therein.

According to this embodiment, a carbon coat is disposed thereby reducing electronic resistance, to enable higher output. According to this embodiment, a carbon coat is disposed to thereby eliminating the necessity of separately adding an electrically conductive material, and thus enabling cost reduction.

Figure 3:
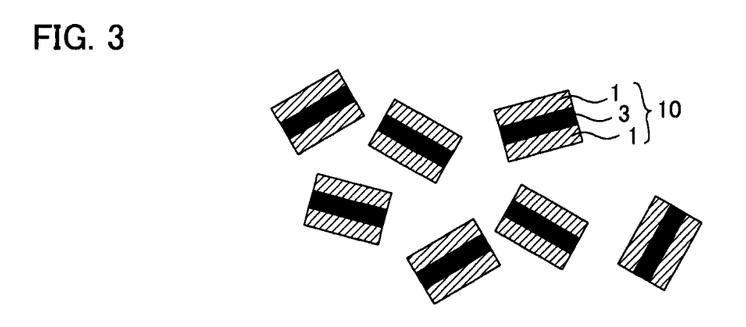
FIG. 3 is an explanatory diagram showing another example of the anode active material of the present invention.

FIG. 3 is an explanatory diagram showing one example of the anode active material in this embodiment. The anode active material 10 shown in FIG. 3 is a flaky material wherein a metallic part 1 which comprises Sn or Si and has a film thickness of 0.05 μm or less, a carbon coat 3, and the same metallic part 1 as mentioned above are laminated therein in this order.

In this embodiment, the film thickness of the metallic part is usually 0.05 μm or less, preferably in the range of 0.005 μm to 0.05 μm, and particularly in the range of 0.01 μm to 0.02 μm.

The carbon coat used in this embodiment is not particularly limited as long as it contains carbon as a main component and has electrical conductivity. The carbon coat may contain trace amounts of impurities generated in manufacturing the carbon coat. The content of carbon in the carbon coat is usually 90 mol % or more, preferably 95 mol % or more.

For example, the film thickness of the carbon coat is preferably in the range of 0.01 μm to 1.0 μm, and particularly in the range of 0.05 μm to 0.1 μm. This is because when the film thickness of the carbon coat is too large, there is a possibility that since the proportion of the metallic part is relatively reduced, the Li absorption capacity is decreased, while when the film thickness of the carbon coat is too small, there is a possibility that electrical conductivity is lowered.

The anode active material in this embodiment can have an arbitrary layer structure as long as it has a metallic part and a carbon coat. In particular, the anode active material in this embodiment is preferably a 2- or 3-layer structure. Specific examples include a 2-layer structure having a metallic part and a carbon coat laminated therein, a 3-layer structure having a metallic part, a carbon coat and a metallic part laminated therein in this order, and a 3-layer structure having a carbon coat, a metallic part and a carbon coat laminated therein in this order.

Particularly, the anode active material in this embodiment is preferably a 3-layer structure having a metallic part, a carbon coat and a metallic part laminated therein in this order. This is because by the presence of metallic parts on both sides of a carbon coat, the proportion of the metallic part per unit volume is increased and thus the capacity per unit volume is increased.

The anode active material in this embodiment is a flaky material comprising a metallic part and a carbon coat laminated therein. The average size of the anode active material in this embodiment, when observed in the plane direction, varies depending on factors such as the type of a lithium secondary battery used, but is usually preferably in the range of 0.05 μm to 50 μm, and particularly in the range of 0.05 μm to 10 μm.

The anode active material in this embodiment can be manufactured for example by forming a metallic film, a carbon coat and a metallic film in this order on a substrate by sputtering and then pulverizing the resulting laminate. A specific manufacturing method will be described later in detail in "2. Sixth Embodiment" in "B. Method for Manufacturing Anode Active Material".

4. Fifth Embodiment

The anode active material in this embodiment is an anode active material comprising a metallic part which comprises Sn or Si and has a film thickness of 0.05 µm or less, wherein the metallic part is formed so as to cover the surfaces of carbon particles.

According to this embodiment, the metallic part is formed so as to cover carbon particles, whereby the anode active material can have increased electrical conductivity to decrease internal resistance and thereby enabling higher output. According to this embodiment, carbon particles are used thereby eliminating the necessity of separately adding an electrically conductive material, thus enabling cost reduction. The anode active material in this embodiment is usually in a powdered state.

Figure 4:
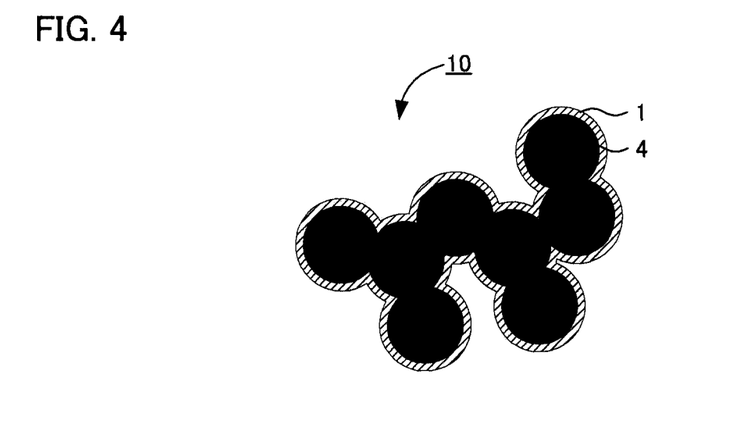
FIG. 4 is an explanatory diagram showing another example of the anode active material of the present invention.

FIG. 4 is an explanatory diagram showing one example of the anode active material in this embodiment. In the anode active material 10 shown in FIG. 4, a metallic part 1 comprising Sn or Si and having a film thickness of 0.05 µm or less is formed so as to cover the surfaces of carbon particles 4.

In this embodiment, the film thickness of the metallic part is usually 0.05 µm or less, preferably in the range of 0.005 µm to 0.05 µm, and particularly in the range of 0.01 µm to 0.02 µm.

The average particle size of the carbon particles used in this embodiment, although varying depending on factors such as the type of a lithium secondary battery used, is usually in the range of 0.005 µm to 1.0 µm, and particularly in the range of 0.01 pin to 0.05 µm. The carbon particles may be either crystalline or amorphous carbon particles. The carbon particles may be either primary or secondary particles.

In this embodiment, the metallic part has been formed so as to cover the surfaces of the carbon particles, wherein the coverage degree is for example in the range of preferably 30% to 99.9%, and more preferably 60% to 99%.

The anode active material in this embodiment can be manufactured for example by forming a metallic film on the surfaces of carbon particles by sputtering. A specific manufacturing method will be described later in detail in "3. Seventh Embodiment" in "B. Method for Manufacturing Anode Active Material".

5. Anode

Now, the anode of the present invention is described in detail. The anode of the present invention is characterized by using the anode active material described above. According to the present invention, the anode is made suitable for rapid charging by using the anode active material described above.

The anode of the present invention usually has an anode layer containing the anode active material and an anode current collector.

When the anode active material in the first embodiment is used, the anode active material is a metallic film, and thus the metallic film can be formed directly on an anode current collector to produce the anode of the invention.

On the other hand, when the anode active material in any of the second to fourth embodiments is used, an anode layer is manufactured usually by using a binder. The binder includes, for example, polyvinylidene fluoride (PVDF), or polytetrafluoroethylene (PTFE). Particularly, the anode active material in the second embodiment preferably contains an electrically conductive material in addition to the metallic flakes.

The anode current collector includes, for example, foils manufactured by forming metals such as copper and nickel into a plate shape.

6. Lithium Secondary Battery

Now, the lithium secondary battery of the present invention is described in detail. The lithium secondary battery of the present invention is characterized by using the anode described above. According to the present invention, the anode can be used to provide a lithium secondary battery suitable for rapid charging.

The lithium secondary battery of the present invention is not particularly limited as long as the anode described above is used. Usually, the lithium secondary battery of the invention includes a cathode, a separator, an electrolyte and a battery case. These members are the same as used in general lithium secondary batteries, and thus their description is omitted herein.

B. Method for Manufacturing Anode Active Material

Now, the method for manufacturing an anode active material according to the present invention is described. The method for manufacturing an anode active material according to the present invention can be roughly divided into the following 3 embodiments (fifth to seventh embodiments). Hereinafter, these embodiments are described respectively.

1. Fifth Embodiment

The method for manufacturing an anode active material in this embodiment comprises steps of: forming a metallic film which comprises Sn or Si and has a film thickness of 0.05 µm or less on a substrate, and pulverizing the metallic film being peeled from the substrate.

According to this embodiment, a flaky anode active material can be obtained, and an anode active material suitable for rapid charging can thereby be obtained.

Figure 5A:
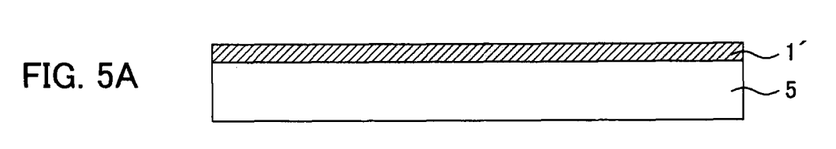
FIGS. 5A and 5B are a process diagram showing one example of the method for manufacturing an anode active material according to the present invention.
Figure 5B:
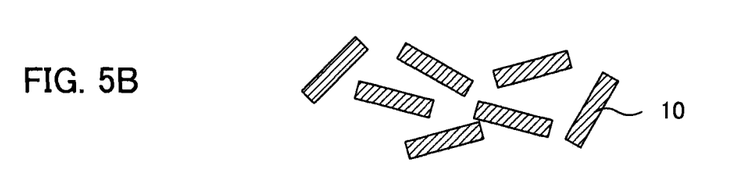

FIGS. 5A and 5B are a process drawing showing one example of the method for manufacturing an anode active material in this embodiment. The method for manufacturing an anode active material shown in FIG. 5 is a method for manufacturing an anode active material 10, comprising steps of: forming a metallic film 1' which comprises Sn or Si and has a film thickness of 0.05 µm or less on a substrate 5 (FIG. 5A); and pulverizing the metallic film 1' being peeled from the substrate 5 (FIG. 5B).

Hereinafter, the method for manufacturing an anode active material in this embodiment is described by reference to each of the steps.

(1) Metallic Film Forming Step

The metallic film forming step in this embodiment is a step wherein a metallic film comprising Sn or Si and having a film thickness of 0.05 µm or less is formed on a substrate.

The substrate used in this embodiment is not particularly limited as long as a metallic film can be formed. Specific examples of the substrate include a glass substrate and the like.

The method of forming the metallic film on the substrate is not particularly limited as long as the metallic film of desired film thickness can be obtained. Examples of such methods include sputtering, wet plating, and vapor deposition. The metallic film obtained in this step is the same as described above in "An anode Active Material", and thus its description is omitted herein.

In this embodiment, the surface of the substrate is preferably coated with a release agent in order to improve the releasability of the substrate from the metallic film. The release agent includes, for example, sodium stearate.

(2) Pulverizing Step

The pulverizing step in this embodiment is a step wherein the metallic film is peeled from the substrate and simultaneously pulverized.

The method of pulverizing the metallic film being peeled from the substrate is not particularly limited as long as the metallic flakes of desired size can be obtained. Specific examples of such methods include a method of using ultrasonic waves, and a method of pulverization with a pulverizing apparatus such as a ball mill. The anode active material obtained by the manufacturing method in this embodiment is the same as described above in "2. Second Embodiment" in "An anode Active Material", and thus its description is omitted herein.

2. Sixth Embodiment

The method for manufacturing an anode active material in this embodiment comprising steps of: forming a metal-carbon laminate on a substrate by carrying out a step of forming a metallic film which comprises Sn or Si and has a film thickness of 0.05 µm or less on a substrate, and a step of forming a carbon coat; and pulverizing the metal-carbon laminate being peeled from the substrate.

According to this embodiment, an anode active material that is a flaky material comprising a metallic part and a carbon coat laminated therein can be obtained, and an anode active material suitable for rapid charging can thereby be obtained.

Figure 6A:
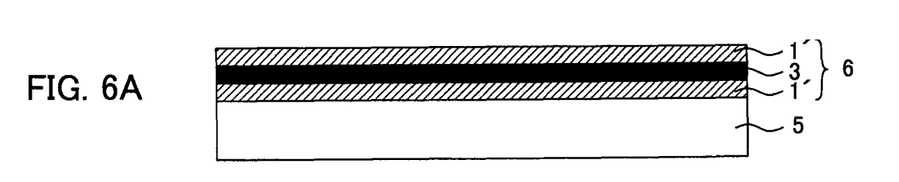
FIGS. 6A and 6B are a process diagram showing another example of the method for manufacturing an anode active material according to the present invention.
Figure 6B:
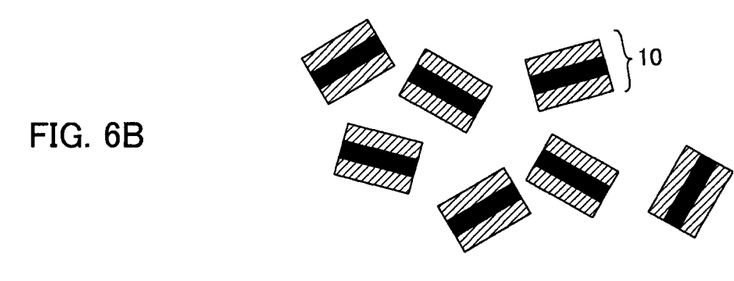

FIGS. 6A and 6B are a process drawing showing one example of the method for manufacturing an anode active material in this embodiment. The method for manufacturing an anode active material shown in FIGS. 6A and 6B is a method for manufacturing an anode active material 10, comprising steps of: forming a metallic film 1' which comprises Sn or Si and has a film thickness of 0.05 µm or less, a carbon coat 3, and the same metallic film 1' as mentioned above, in this order on a substrate 5, to form a metal-carbon laminate 6 on the substrate 5 (FIG. 6A); and pulverizing the metal-carbon laminate 6 being peeled from the substrate 5 (FIG. 6B).

Hereinafter, the method for manufacturing an anode active material in this embodiment is described by reference to each of the steps.

(1) Metal-Carbon Laminate Forming Step

The metal-carbon laminate forming step in this embodiment is a step forming a metal-carbon laminate on a substrate by carrying out: a step of forming a metallic film which comprises Sn or Si and has a film thickness of 0.05 µm or less on the substrate, and a step of forming a carbon coat.

The order in which formation of a metallic film and formation of a carbon coat are conducted in this embodiment is not limited. That is, first the metallic film and then the carbon coat may be formed on a substrate, or first the carbon coat and then the metallic film may be formed on a substrate. In this embodiment, formation of a metallic film and formation of a carbon coat may be alternately repeated. The metal-carbon laminate obtained in this step can thereby have an arbitrary layer structure. Particularly, in this embodiment, the metal-carbon laminate is preferably a 2- or 3-layer structure. Particularly, the metal-carbon laminate is preferably a 3-layer structure having a metallic film, a carbon coat and a metallic film laminated in this order. This is because by the presence of the metallic parts on both sides of the carbon coat, the proportion of the metallic part per unit volume is increased and thus the capacity per unit volume is increased.

The metallic film forming step is the same as described above in "1. Fifth Embodiment", and thus its description is omitted herein.

The carbon coat forming step is a step of forming a carbon coat on the metallic film. The method of forming the carbon coat is not particularly limited as long as the carbon coat of desired film thickness can be obtained. Examples of such methods include sputtering, plasma CVD, and pulsed laser deposition (PLD).

(2) Pulverizing Step

The pulverizing step in this embodiment is a step of peeling and pulverizing the metal-carbon laminate from the substrate. The pulverizing step in this embodiment is the same as described above in "1. Fifth Embodiment", and thus its description is omitted herein. The anode active material obtained by the manufacturing method in this embodiment is the same as described above in "3. Third Embodiment" in "An anode Active Material", and thus its description is omitted herein.

3. Seventh Embodiment

The method for manufacturing an anode active material in this embodiment comprises a step of forming a metallic film which comprises Sn or Si and has a film thickness of 0.05 µm or less on the surfaces of carbon particles.

According to this embodiment, an anode active material having a metallic film formed on the surfaces of carbon particles can be obtained, and an anode active material suitable for rapid charging can thereby be obtained.

Figure 7A:
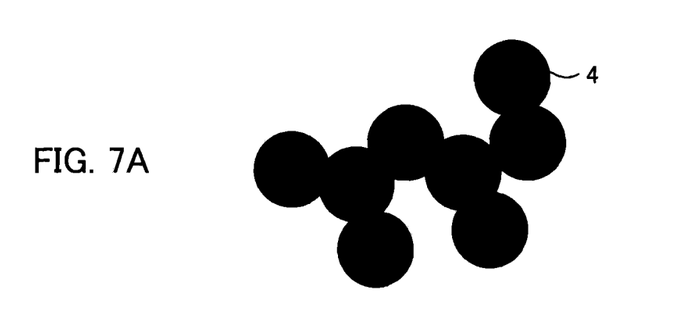
FIGS. 7A and 7B are a process diagram showing another example of the method for manufacturing an anode active material according to the present invention.
Figure 7B:
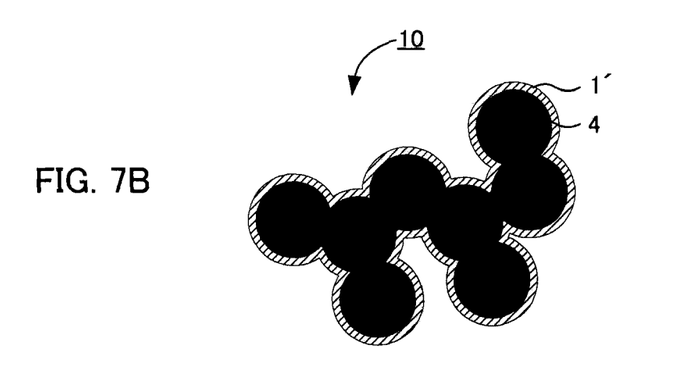

FIGS. 7A and 7B are a process drawing showing one example of the method for manufacturing an anode active material in this embodiment. The method for manufacturing an anode active material shown in FIGS. 7A and 7B are a method for manufacturing an anode active material 10, comprising a step of: preparing carbon particles 4 (FIG. 7A) and forming a metallic film 1' which comprises Sn or Si and has a film thickness of 0.05 µm or less on the surfaces of the carbon particles 4 (FIG. 7B).

Hereinafter, the method for manufacturing an anode active material in this embodiment is described in detail by reference to each of the steps.

(1) Metallic Film Forming Step

The metallic film forming step in this embodiment is a step wherein a metallic film comprising Sn or Si and having a film thickness of 0.05 µm or less is formed on the surfaces of carbon particles.

The carbon particles used in this embodiment are the same as described above in "4. Fourth Embodiment" in "An anode Active Material", and thus its description is omitted herein.

The method of forming the metallic film on the surfaces of carbon particles is not particularly limited as long as the metallic film of desired film thickness can be obtained. Examples of the method include sputtering, wet plating, and vapor deposition. The anode active material obtained by the manufacturing method in this embodiment is the same as described above in "4. Fourth Embodiment" in "An anode Active Material", and thus its description is omitted herein.

C. Method for Manufacturing Anode

Now, the method for manufacturing an anode in this embodiment is described in detail. The method for manufacturing an anode according to the present invention comprises a step of forming a metallic film which comprises Sn or Si and has a film thickness of 0.05 µm or less on an anode current collector.

According to the present invention, an anode having a filmy anode active material formed on an anode current collector can be obtained, and an anode suitable for rapid charging can thereby be obtained.

The metallic film forming step in the present invention is the same as in described above in "1. Fifth Embodiment" in "B. Method for Manufacturing Anode Active Material", and thus its description is omitted herein. The anode current collector used in the present invention and the anode obtained in the present invention are the same as in described above in "A. Anode Active Material", and thus their description is omitted herein.

The present invention is not limited to the embodiments described above. The embodiments described above are mere illustrative, and those having substantially the same constitution and the same working effect as in the technical idea described in the present claims are included in the technical scope of the present invention.

EXAMPLES

Hereinafter, the present invention is described in more detail by reference to the Examples.

Example 1-1

Preparation of Anode

First, a rolled copper foil (manufactured by Nippon Foil Mfg. Co., Ltd.) prepared as an anode current collector was disposed on a glass substrate. Then, an elementary substance of tin or silicon was used as a sputtering target to form a tin film or an elementary substance of silicon of 0.01 μm in film thickness on the rolled copper foil in an argon gas atmosphere at 210 sccm at a degree of vacuum of $1.7 \times 10^{-2}$ Pa. Then, the resulting metallic film and the rolled cupper foil were released from the glass substrate, followed by cutting off the specimen in the form of a circle having a diameter of 16 mm therefrom to give an anode for coin cell.

Preparation of Counter Electrode

To evaluate the charge-discharge characteristics of the film electrode by using a coin cell, metal lithium was used as a counter electrode. From the metal lithium, lithium in the form of a circle having a diameter of 19 mm that was the size of the coin cell was cut out, to prepare a counter electrode for coin cell.

Preparation of Coin Cell

The above counter electrode (metal lithium) was disposed on the bottom of a case can (anode can), and a separator was disposed thereon. Then, an electrolytsis solution was dropped onto the separator. The electrolytsis solution used was prepared by dissolving lithium hexafluorophosphate ($LiPF_6$) as a supporting salt to a concentration of 1 mol/L in a mixture of EC (ethylene carbonate) and DMC (dimethyl carbonate) at a volume ratio of 3:7. Then, a packing was disposed on the separator, the above cathode was disposed inside the packing, a spacer and a wave washer were disposed on the cathode, a cap can (cathode can) was disposed on the wave washer, and the cap can was caulked on the case can, thereby producing a coin cell.

Example 1-2

A coin cell was obtained in the same manner as in Example 1-1 except that the film thickness of the metallic film was 0.05 μm.

Comparative Example 1-1

A coin cell was obtained in the same manner as in Example 1-1 except that the film thickness of the metallic film was 0.1

[Evaluation]

Figure 8:
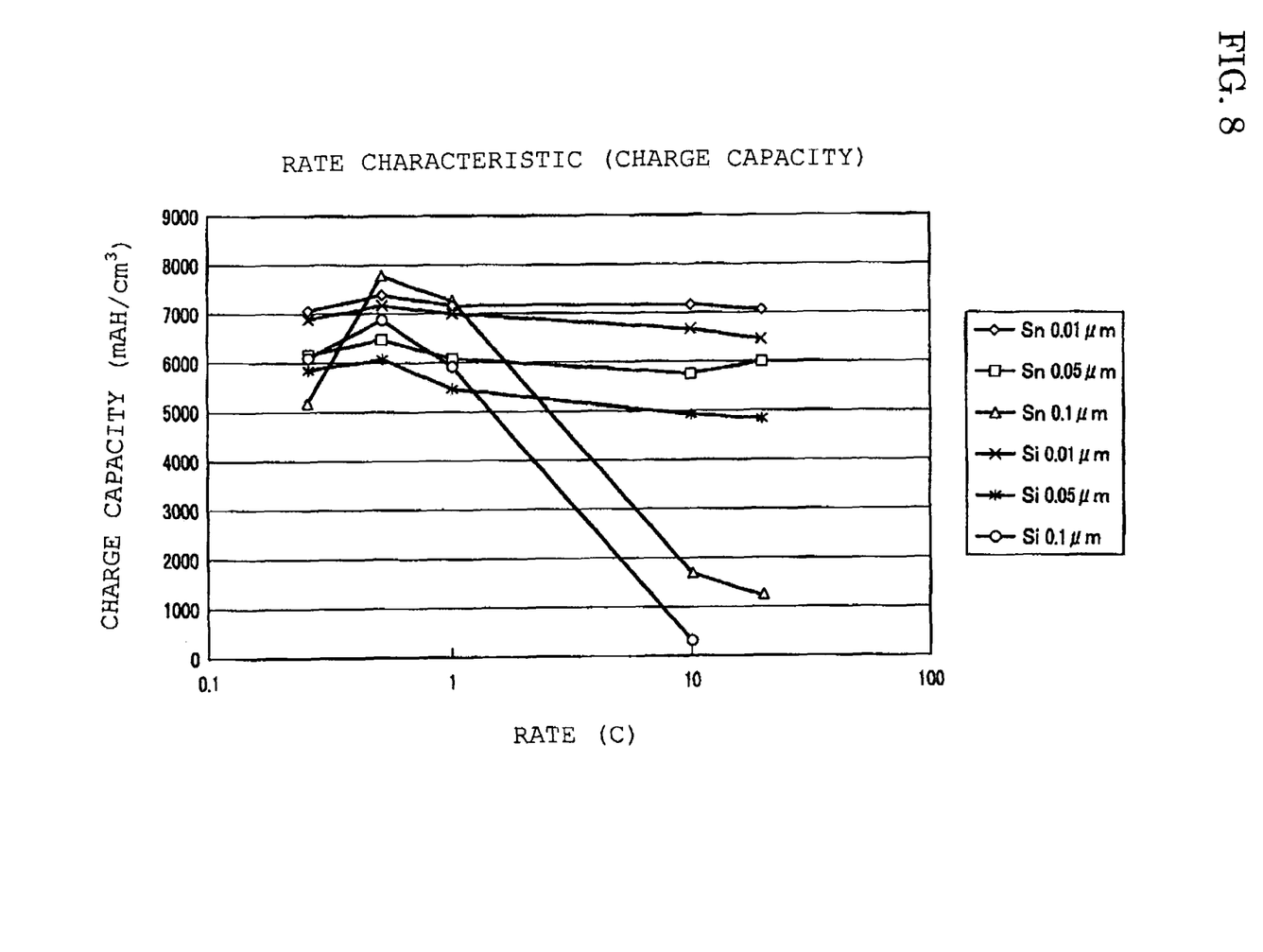
FIG. 8 is a graph showing the relationship between rate (C) and charge capacity (mAh/cm$^3$).
Figure 9:
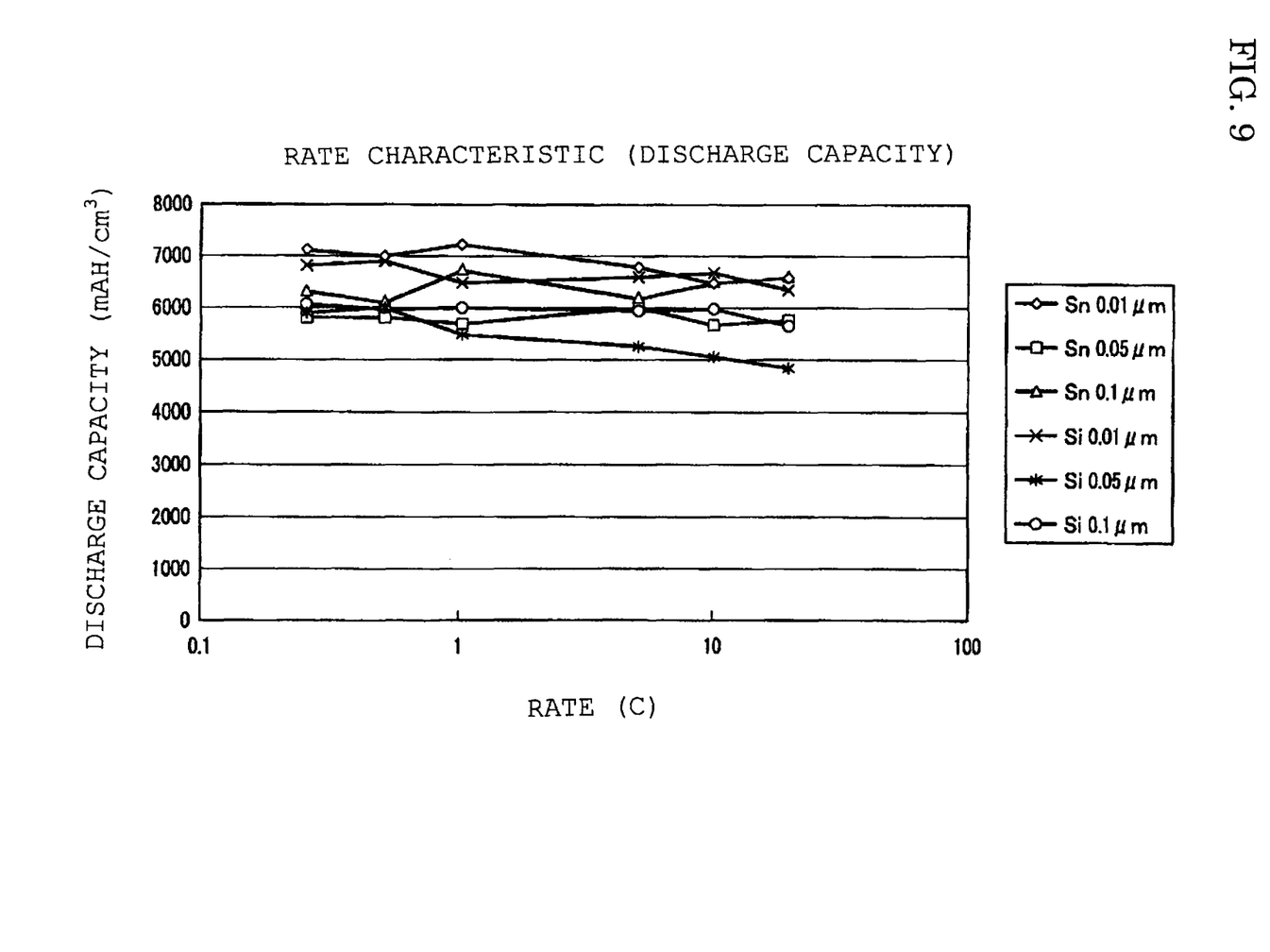
FIG. 9 is a graph showing the relationship between rate (C) and discharge capacity (mAh/cm$^3$).

The coin cells obtained in Example 1-1, Example 1-2 and Comparative Example 1-1 were used to evaluate charge-discharge characteristics. The charge capacity of the obtained coin cell was determined by subjecting the coin cell to constant current discharge (which means insertion of Li ions into tin or silicon and corresponds, in a general lithium secondary battery, to charging) at various current values and then calculating the capacity until 10 mV was reached. Separately, the discharge capacity of the obtained coin cell was determined by completely discharging the coin cell to 10 mV at a current value of C/2, then subjecting it to constant current charging (which means elimination of Li ions from tin or silicon and corresponds, in a general lithium secondary battery, to discharging) at various current values and calculating the capacity until 3 V was reached. The obtained results are shown in FIGS. 8 and 9. FIG. 8 is a graph showing charge capacity, and FIG. 9 is a graph showing discharge capacity.

From FIG. 8, it was revealed that when the film thickness was 0.01 to 0.05 μm, high charge capacity could be obtained at high current (high rate), and rapid charging became possible. When the film thickness was 0.1 μm, high charge capacity could not be obtained at high current (high rate). From FIG. 9, it was revealed that even when the film thickness was 0.1 μm, high discharge capacity could be obtained at high current (high rate).

Example 2-1

Preparation of Anode Active Material

A dispersion of sodium stearate as a release agent in water and ethanol (80:20) was applied onto the surface of a PET film having a film thickness of 20 μm and then dried to give a substrate to be used. A tin or silicon film was formed by sputtering on this substrate. An elementary substance of tin or silicon was used as a sputtering target to form a tin or silicon film of 0.01 μm in film thickness on the substrate in an argon gas atmosphere at 210 sccm at a degree of vacuum of $1.7 \times 10^{-2}$ Pa. Thereafter, an elementary substance of carbon was used as a sputtering target to form a carbon coat of 0.05 μm in film thickness on the tin or silicon film, in an argon gas atmosphere at 210 sccm at a degree of vacuum of $1.7 \times 10^{-2}$ Pa. Thereafter, a tin or silicon film of 0.01 μm in film thickness was further formed on the carbon coat in the same manner as described above, to yield a 3-layer laminate composed of the metallic film/carbon coat/metallic film. The same metal was used in the metallic films formed on both sides of the carbon coat.

Thereafter, the resulting laminate with the substrate was placed in an ultrasonic cleaner filled with water, and peeled and simultaneously pulverized by supersonic vibration. After pulverization, vacuum drying at 60° C. gave a flaky anode active material.

Preparation of Anode

The anode active material thus obtained and PVDF prepared as a binder (KF polymer, L#1120, manufactured by Kureha Corporation) were mixed in a ratio of the anode active material PVDF=92.5:7.5, to prepare a paste. Then, this paste was applied in a coating weight of 1 mg/cm$^2$ onto a copper foil and dried at 120° C. for 1 hour, from which the specimen in the form of a circle having a diameter of 16 mm was then cut off, to obtain an anode for coin cell.

Preparation of Coin Cell

A coin cell was obtained in the same manner as in Example 1-1 except that the anode obtained by the method described above was used.

Example 2-2, Example 2-3, and Comparative Example 2-1

Coin cells were obtained in the same manner as in Example 2-1 except that the film thickness of each layer in the laminate was as shown in Table 1.

Example 2-4 and Comparative Example 2-2

Preparation of Anode Active Material

Coin cells were obtained in the same manner as in Example 2-1 except that a 2-layer laminate composed of a metallic film/carbon coat was formed on a substrate, and that the film thickness of each layer in the laminate was as shown in Table 1.
[Evaluation]

The coin cells obtained in Examples 2-1 to 2-4 and Comparative Examples 2-1 and 2-2 were used to evaluate charge-discharge characteristics. The charge capacity of the obtained coin cell was determined by subjecting the coin cell to constant current discharge (which means insertion of Li ions into tin or silicon and corresponds, in a general lithium secondary battery, to charging) at a current value corresponding to 10 C and then calculating the capacity until 10 mV was reached. Separately, the discharge capacity of the obtained coin cell was determined by completely discharging the coin cell to 10 mV at a current value of C/2, then subjecting it to constant current charging (which means elimination of Li ions from tin or silicon and corresponds, in a general lithium secondary battery, to discharging) at a current value corresponding to 10 C and calculating the capacity until 3 V was reached. The obtained results are shown in Table 1.

From Table 1, it was revealed that the coin cells in the Examples, regardless of whether tin or silicon was used, could give a high charge capacity at high current (high rate) and enabled rapid charging. The coin cells in the Comparative Examples, on the other hand, were revealed to be inferior in charge capacity.

Example 3-1

Preparation of Anode Active Material

Powdery amorphous carbon (Nano Powder manufactured by Aldrich) was used as a substrate to be subjected to sputtering. A tin or silicon film was formed by sputtering on this substrate. An elementary substance of tin or silicon was used as a sputtering target to form a tin or silicon film of 0.01 μm in film thickness on the surface of the amorphous carbon in an argon gas atmosphere at 210 sccm at a degree of vacuum of $1.7 \times 10^{-2}$ Pa, to obtain a powdery anode active material.

Preparation of Coin Cell

A coin cell was obtained in the same manner as in Example 2-1 except that the anode active material obtained by the method described above was used.

Example 3-2, Example 3-3, and Comparative Example 3-1

Coin cells were obtained in the same manner as in Example 3-1 except that the film thickness of the metallic film was as shown in Table 2.

Reference Example 3-1

A coin cell was obtained in the same manner as in Example 3-1 except that powdery amorphous silicon dioxide (manufactured by JAPAN PURE CHEMICAL CO., LTD.) was used as a substrate to be subjected to sputtering in place of the

TABLE 1

|  |  | Example 2-1 | Example 2-2 | Example 2-3 | Comparative Example 2-1 |
|---|---|---|---|---|---|
| Sputtering film thickness: μm Metallic film/carbon coat/metallic film |  | 0.01/0.05/0.01 | 0.02/0.1/0.02 | 0.05/0.1/0.05 | 0.1/0.1/0.1 |
| Tin | Charge capacity mAh/cm³ (Li insertion) | 2030 | 2010 | 2140 | 1050 |
|  | Discharge capacity mAh/cm³ (Li elimination) | 2020 | 2040 | 3250 | 4200 |
| Silicon | Charge capacity mAh/cm³ (Li insertion) | 2450 | 2230 | 2370 | 1170 |
|  | Discharge capacity mAh/cm³ (Li elimination) | 2130 | 2210 | 4100 | 5920 |

|  |  | Example 2-4 | Comparative Example 2-2 |
|---|---|---|---|
| Sputtering film thickness: μm Metallic film/carbon coat |  | 0.01/0.05 | 0.1/0.05 |
| Tin | Charge capacity mAh/cm³ (Li insertion) | 960 | 430 |
|  | Discharge capacity mAh/cm³ (Li elimination) | 1030 | 1030 |
| Silicon | Charge capacity mAh/cm³ (Li insertion) | 1080 | 520 |
|  | Discharge capacity mAh/cm³ (Li elimination) | 1450 | 1320 | powdery amorphous carbon, and also that the film thickness of the metallic film was 0.05 μm.

[Evaluation]

The coin cells obtained in Examples 3-1 to 3-3 and Comparative Examples 3-1 and 3-2 were used to evaluate charge-discharge characteristics. The evaluation method is the same as the above-described method of evaluating the coin cells prepared in Examples 2-1 etc., and thus its description is omitted herein. The obtained results are shown in Table 2.

Preparation of Anode

The anode active material thus obtained, HS100 prepared as an electrically conductive material (manufactured by Denki Kagaku Kogyo Kabushiki Kaisha), and PVDF prepared as a binder (KF polymer, L#1120, manufactured by Kureha Corporation) were mixed in a ratio of the anode active material:electrically conductive material:PVDF=85:10:5, to prepare a paste. Then, this paste was applied in a coating weight of 1 mg/cm$^2$ onto a copper foil and dried at 120° C. for 1 hour, from which the specimen in the form of a circle having a diameter of 16 mm was then cut off, to obtain an anode for coin cell.

TABLE 2

| Substrate | | Example 3-1 carbon powder | Example 3-2 carbon powder | Example 3-3 carbon powder | Comparative Example 3-1 carbon powder | Reference Example 3-1 silicon dioxide powder |
|---|---|---|---|---|---|---|
| Sputtering film thickness (μm) | | 0.01 | 0.02 | 0.05 | 0.1 | 0.05 |
| Tin | Charge capacity mAh/cm$^3$ (Li insertion) | 2680 | 2710 | 2890 | 1010 | 1220 |
| | Discharge capacity mAh/cm$^3$ (Li elimination) | 2570 | 2670 | 2740 | 2880 | 1390 |
| Silicon | Charge capacity mAh/cm$^3$ (Li insertion) | 2860 | 2730 | 2940 | 1050 | 1310 |
| | Discharge capacity mAh/cm$^3$ (Li elimination) | 2720 | 2690 | 2590 | 2970 | 1450 |

From Table 2, it was revealed that the coin cells in the Examples, regardless of whether tin or silicon was used, could give a high charge capacity at high current (high rate) and enabled rapid charging. The coin cell in the Comparative Example, on the other hand, was revealed to be inferior in charge capacity. The coin cell in the Reference Example, although relatively low in charge and discharge capacity, was revealed to be small in difference between charge capacity and discharge capacity.

Example 4-1

Preparation of Anode Active Material

A dispersion of sodium stearate as a release agent in water and ethanol (80:20) was applied onto the surface of a PET film having a thickness of 20 μm and then dried to give a substrate to be used. A tin or silicon film was formed by sputtering on this substrate. An elementary substance of tin or silicon was used as a sputtering target to form a tin or silicon film of 0.01 μm in film thickness on the substrate in an argon gas atmosphere at 210 sccm at a degree of vacuum of 1.7× 10$^{-2}$ Pa.

Thereafter, the resulting metallic film with the substrate was placed in an ultrasonic cleaner filled with water, and peeled and simultaneously pulverized by supersonic vibration. After pulverization, vacuum drying at 60° C. gave a flaky anode active material.

Preparation of Coin Cell

A coin cell was obtained in the same manner as in Example 2-1 except that the anode obtained by the method described above was used.

Example 4-2, Example 4-3, Comparative Example 4-1, and Comparative Example 4-2

Coin cells were obtained in the same manner as in Example 4-1 except that the film thickness of the metallic film was as shown in Table 3.

[Evaluation]

The coin cells obtained in Examples 4-1 to 4-3 and Comparative Examples 4-1 and 4-2 were used to evaluate charge-discharge characteristics. The evaluation method is the same as the method of evaluating the coin cells prepared in Examples 2-1 etc., and thus its description is omitted herein. The obtained results are shown in Table 3.

TABLE 3

|  |  | Example 4-1 | Example 4-2 | Example 4-3 | Comparative Example 4-1 | Comparative Example 4-2 |
|---|---|---|---|---|---|---|
| Sputtering film thickness: μm | | 0.01 | 0.03 | 0.05 | 0.1 | 1 |
| Electrically conductive material (wt %) | | 10 | 10 | 10 | 10 | 10 |
| Tin | Charge capacity mAh/cm$^3$ (Li insertion) | 3370 | 3280 | 3060 | 1420 | 1380 |
| | Discharge capacity mAh/cm$^3$ (Li elimination) | 3250 | 3170 | 3030 | 3220 | 3150 |
| Silicon | Charge capacity mAh/cm$^3$ (Li insertion) | 3420 | 3310 | 3050 | 1650 | 1590 |
| | Discharge capacity mAh/cm$^3$ (Li elimination) | 3340 | 3280 | 3120 | 3320 | 3090 |

From Table 3, it was revealed that the coin cells in the Examples, regardless of whether tin or silicon was used, could give a high charge capacity at high current (high rate) and enabled rapid charging. The coin cells in the Comparative Examples, on the other hand, were revealed to be inferior in charge capacity.

The invention claimed is:

1. An anode active material comprising a metallic part which comprises Sn or Si and has a film thickness of 0.05 μm or less,
    wherein the anode active material is a flaky material comprising the metallic part and a carbon coat laminated therein,
    a film thickness of the carbon coat is in the range of 0.01 μm to 1.0 μm,
    the anode active material is a 3-layer structure having a metallic part, a carbon coat and a metallic part laminated in that order, or a 3-layer structure having a carbon coat, a metallic part and a carbon coat laminated in that order, and
    the metallic part in the 3-layer structure is a single layer.

2. An anode which uses the anode active material of claim 1.

3. A method for manufacturing an anode active material, comprising steps of:
    forming a metal-carbon laminate on a substrate by carrying out a step of forming a metallic film which comprises Sn or Si and has a film thickness of 0.05 μm or less on the substrate, and a step of forming a carbon coat having a film thickness in the range of 0.01 μm to 1.0 μm;
    peeling the metal-carbon laminate from the substrate; and
    pulverizing the metal-carbon laminate,
    wherein the metal-carbon laminate is a 3-layer structure having a metallic film, a carbon coat and a metallic film laminated in that order, or a 3-layer structure having a carbon coat, a metallic film and a carbon coat laminated in that order, and
    the metallic film in the 3-layer structure is a single layer.

4. A lithium secondary battery which uses the anode of claim 2.

5. The method of claim 3, wherein the peeling and the pulverizing occur simultaneously.

6. The anode active material according to claim 1, wherein the anode active material is the 3-layer structure having a carbon coat, a metallic part and a carbon coat laminated in that order.

7. The method for manufacturing an anode active material according to claim 3, wherein the pulverizing the metal-carbon laminate comprises using ultrasonic waves or using a pulverizing apparatus including a ball mill.

8. The anode active material according to claim 1, wherein the film thickness of the metallic part is from 0.01 μm to 0.05 μm.

9. The method for manufacturing an anode active material according to claim 3, wherein the film thickness of the metallic film is from 0.01 μm to 0.05 μm.

* * * * *